May 7, 1968  R. G. AMES  3,381,376
PORTABLE INERTIA IMPACT DEVICE FOR CUTTING ELECTRIC
OUTLET OPENINGS IN WALLBOARD
Filed Sept. 12, 1966  2 Sheets-Sheet 2
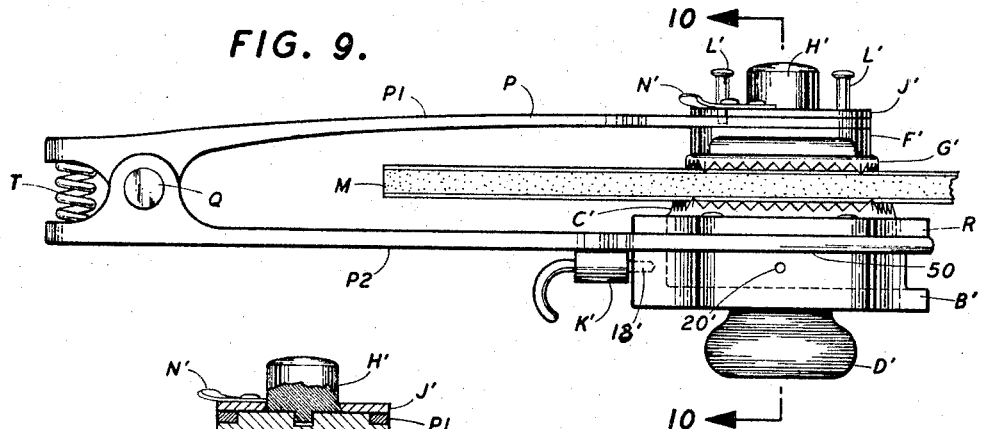
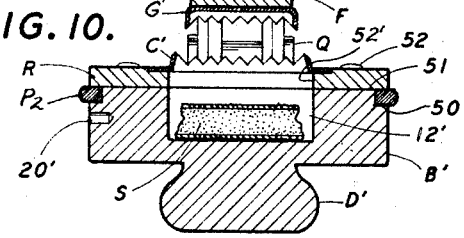
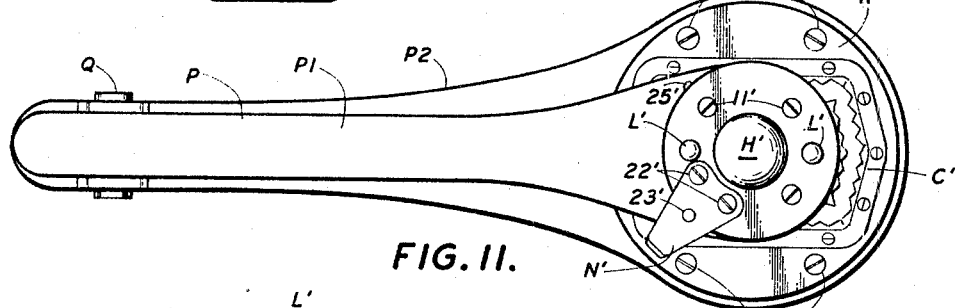
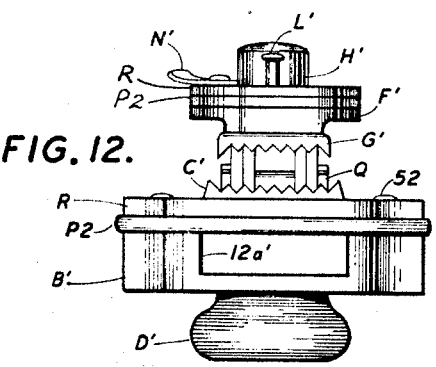
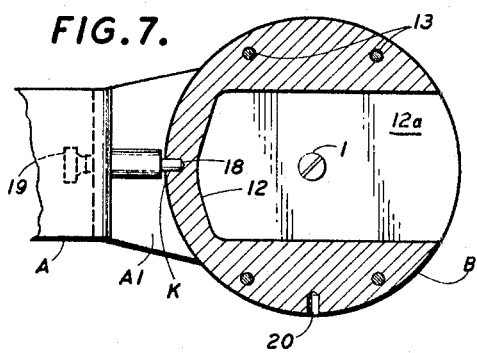
INVENTOR.
ROBERT G. AMES
BY
*William R. Piper*
ATTORNEY

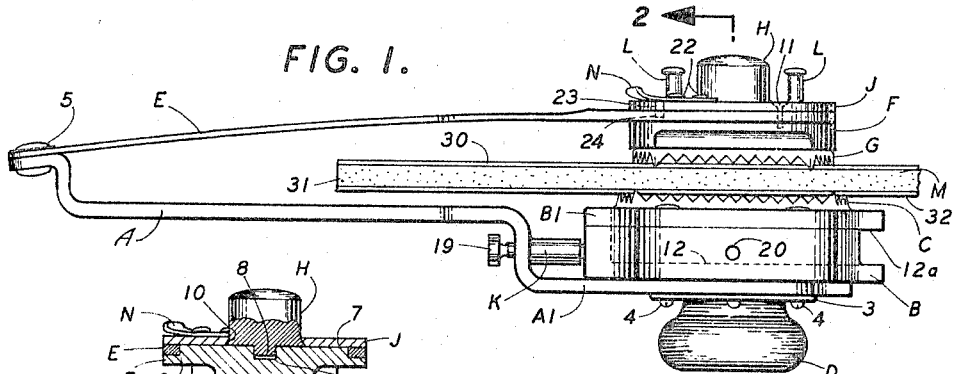

United States Patent Office 3,381,376
Patented May 7, 1968

3,381,376
PORTABLE INERTIA IMPACT DEVICE FOR CUTTING ELECTRIC OUTLET OPENINGS IN WALLBOARD
Robert G. Ames, Hillsborough, Calif., assignor, by mesne assignments, to Bliss & Laughlin Industries, Inc., Oak Brook, Ill., a corporation of Delaware
Filed Sept. 12, 1966, Ser. No. 578,562
6 Claims. (Cl. 30—358)

ABSTRACT OF THE DISCLOSURE

A device for punching out an opening in a wallboard to receive an electric outlet box and including a frame having two permanently connected arms for receiving the thickness of the wallboard therebetween. One arm carries a male die and the other arm carries a female die and the two arms hold the two dies in registration with each other while permitting them to be moved together for cutting an opening in the wallboard. The device is portable and the male die may be hit for driving it through the wallboard for cutting the opening.

---

An object of my present invention is to provide a portable device for cutting openings in wallboard that makes use of a spring arm for carrying the male die. The spring arm also carries a head for the die and the head may be struck by a hammer or the like for driving the male die into a section of walboard that is received between the male and a female dies. The latter die has a weighted handle that absorbs the blow when the head is struck for forcing the male die into the walboard. The female die cuts into the other side of the wallboard at the same time with the result that a slug is cut out and removed from the wallboard and leaves an opening large enough to receive an electric outlet box. The two dies may be rotated about their common axis through an arc of 90° if desired and then secured against further rotation.

I provide novel means for positioning the male die at the proper place on the wallboard before forcing the die into it. This means comprises positioning and guide pins that may be driven into the wallboard prior to forcing the male die into the same board. These pins will cause the male die to cut into the wallboard at the same place should the operator strike the head more than once in forcing the male die into the board. The holes in the wallboard that are made by the positioning and guide pins are formed in the portion that is cut out as a slug by the two dies. In this way the remaining wallboard is not marred.

The standard wallboard has a gypsum core and a layer of paper covers both of its surfaces. The two dies are in registration with each other and the female die is larger than the male die and will cut a larger opening through the wallboard paper contacted by it than will the male die cut through its associate paper on the opposite side of the wallboard. The female die has an opening through which the cut out piece from the wallboard is forced by the male die. The wall of the opening in the wallboard will be tapered because the gypsum core lying between the outer layers of paper will break along inclined planes extending between the boundary of the substantially rectangular smaller opening cut by the male die in the paper contacted by it and the boundary of the similarly shaped and larger opening cut by the female die in the paper contacted by it.

The tapered opening in the wallboard will receive an electric outlet box and the tapered edge of the opening will have its front smaller area portion contact with the box periphery. If the wallboard opening should be slightly out of registration with the box, the front portion of the edge that is out of line can be compressed a little so as to fit the box contour. The tapered edge portion of the wallboard opening that needs to be compressed slightly obviates the necessity of compressing the entire thickness of the wallboard at this edge because the rear portion of this edge is spaced from the outlet box wall. Moreover the front surface of the wallboard adjacent to this slightly compressed edge of the opening will not be unduly bulged.

The device is simple in construction and is durable and efficient for the purpose intended.

Other objects and advantages will appear as the specification continues. The novel features of the invention will be set forth in the appended claims.

Drawings

For a better understanding of my invention, reference should be made to the accommpanying drawings, forming part of this specification, in which:

FIGURE 1 is a side elevation of the device.
FIGURE 2 is a transverse section taken along the line 2—2 of FIGURE 1.
FIGURE 3 is a top plan view of the device.
FIGURE 4 is an end view when looking at the right hand end of FIGURE 1.
FIGURE 5 is a longitudinal section through a portion of the device and is taken along the line 5—5 of FIGURE 3.
FIGURE 6 is a diagrammatic view of the two cutting dies.
FIGURE 7 is a horizontal section taken along the line 7—7 of FIGURE 5.
FIGURE 8 is a section through a portion of wallboard to illustrate the type of opening cut into the board by the two dies.
FIGURE 9 is a side elevation of a modified form of the device.
FIGURE 10 is a transverse section taken along the line 10—10 of FIGURE 9.
FIGURE 11 is a top plan view of FIGURE 9.
FIGURE 12 is an end view when looking at the right hand end of FIGURE 9.

While I have shown only the preferred forms of my invention, it should be understood that various changes, or modifications, may be made within the scope of the annexed claims without departing from the spirit thereof.

Detailed description

In carrying out my invention, I provide a frame member indicated generally at A, in FIGURE 1. This frame member has a portion A1 and FIGURE 5 shows this portion acting as a support for a holder B for a female die C. A weighted knob D is secured to the female die holder B and is secured thereto by a screw 1 so that the die C, holder B, and knob D will have a common axis about which all three members may be rotated. The knob D extends through an opening 2 in the offset frame portion A1 and semi-circular flanges 3—3 are secured to the holder B by screws 4 and are received in the opening 2. The flanges secure the holder B and knob D to the frame offset portion A1 while permitting the knob and holder to be rotated about their common axis and to rotate the female die C into the desired angular position for a purpose hereinafter described.

Before describing the holder B and its associate parts in detail, it is best to state that a spring E has one end secured to an end of the frame member A by rivets 5, or other suitable fastening means. The spring arm carries a male die holder, indicated generally at F, see FIGURE 1. The die holder F carries a male die G which is shown in section in FIGURES 2 and 5. The free end of the spring arm E has a circular opening 6 therein, for rotatably receiving a cylindrical boss 7 that is integral with the male die holder F. A head H has a central projection 8 receivable in a central recess 9 in the holder F. A circular retaining disc J has an opening 10, see FIGURE 3, for receiving the head H and the disc is secured to the boss 7 of the holder F by screws 11, or other suitable fastening means. The base of the head H has an outwardly flared annular bead that is contacted by the conical wall of the opening 10 for securing the head to the die holder F. The common axis for the male die G, die holder F and head H coincides with the common axis for the female die C, die holder B and the knob D.

Returning to a further description of the female die C and its associate parts, it will be noted from FIGURES 1, 2, 4 and 5, that the female die holder B, has a slug receiving compartment 12 that has an outlet opening 12a through which the slug is ejected that is cut from the wallboard by the dies. A circular plate B1 is secured to the female die holder B by screws 13, or other suitable fastening means and the plate has a central opening 14 that communicates with the compartment 12 and with the female die C. FIGURES 2, 5 and 6 show that the femal die is substantially rectangular in shape and it has a flange 15 that is secured to the plate B1 by screws 16, as shown in FIGURE 6. The rim of the female die C is provided with teeth 17 and the corner teeth 17a are preferably longer than the others so as to be used as indicators as to where the die will cut into the wallboard. The rim of cutting teeth 17 can be formed into other shapes besides the substantially rectangular shape shown.

In FIGURE 7, I show how the female die holder B can be secured in either one of two positions. The holder has a recess 18 for receiving the end of a spring-biased pin indicated generally at K. The housing for the pin is supported by the frame A and the pin has a head 19 by means of which the pin may be manually retracted from the recess 18 to permit the holder B to be rotated through an arc of 90° in a clockwise direction in FIGURE 7 so as to bring a second recess 20 into registration with the pin K. The operator grasps the knob D and rotates it so as to rotate the holder B. When the recess 20 registers with the pin K, the latter will enter the recess for preventing accidental rotation of the die holder.

The male die holder F has positioning and guide pins L for the male die G that can be initially driven into a sheet of wallboard M, see FIGURE 5, for properly positioning the male die before forcing it into the wallboard. Also the guide pins L will prevent the male die from striking the wallboard at different places should it be necessary for the operator to strike the head H more than once in order to cut the slug from the board. The guide pins L are preferably mounted in fiber sleeves 21 so as to be frictionally held in the positions into which they have been moved. The pins L are provided with heads so that they can be retracted from the wallboard M into which they may be driven, as shown in FIGURE 5.

It is possible to rotate the male die holder F and male die G through an arc of 90°. FIGURES 1 and 3 show a metal spring handle N that is secured to the top of the retaining disc J by screws 22 or other suitable fastening means. The handle N projects radially beyond the rim of the disc and it has a downwardly extending projection 23 that is yieldingly received in a recess 24 provided in the spring arm E, see FIGURE 1. The arm E has another recess 26, see FIGURE 3, which is angularly disposed 90° from the recess 24 and is designed to receive the projection 23 after the arm N has been manually moved so as to rotate the disc J and die holder F through 90°. This rotation swings the male die through a 90° arc.

The male die G is substantially rectangular in shape and is smaller in area than the female die. The diagrammatic view of FIGURE 6 shows the relationship of the two dies. FIGURES 2, 5 and 6 illustrate the male die G as comprising a plate with a flange 26. The flange is substantially rectangular in shape and has wallboard cutting teeth 27 on its rim. The corner teeth 27a are longer than the other teeth 27, see FIGURE 4, and can be used for lining up the die at the proper place on the wallboard before driving in the guide nails L into the wallboard. The tendency of the spring arm E is to keep the male die in yielding contact with one surface of the wallboard while the female die C contacts with the opposite wallboard surface. The plate of the male die G is secured to the die holder F by screws 28 or other suitable fastening means as shown in FIGURE 6.

*Operation*

From the foregoing description of the various parts of the device, the operation thereof may be readily understood. Normally the wallboard pieces are four feet wide and eight feet long and are mounted so that the eight foot length extends horizontally. In about 95% of the cases, the shorter axis of the wallboard opening parallels the wallboard edge. Therefore in most cases the shorter axes of both the male and female dies will be at right angles to the length of the frame A.

The various steps of the operation will now be mentioned. The operator first marks on the wallboard M where an opening 29 is to be cut. He then places the wallboard between the two dies and carefully positions the male die G so that it registers with the marking on the wallboard. The longer teeth 27a of the male die will start entering the paper layer 30 that covers one side of the gypsum core 31 while the longer teeth 17a of the female die C will start entering the paper layer 32 that covers the other side of the core.

The operator now drives the guide nails L into the wallboard M as clearly shown in FIGURE 5. He then holds the knob D with one hand and strikes the head H with a hammer or the like to drive the male die into the wallboard for cutting it. The same blow will drive the female die into the opposite side of the wallboard for cutting into it. If a sufficiently hard blow is struck on the head H, both dies will pierce the thickness of the wallborad to cut a slug from it and leave the opening 29 with tapered edges 29a, as shown in FIGURE 8. If the first blow is not hard enough to cut the slug from the wallboard, the positioning and guide pins L will prevent the male die G from moving into another position on the wallboard before the next blow strikes the head H. The weight of the knob D and the weight of the female die holder B provides sufficient inertia to absorb the shock of the blow when the head H is struck by the hammer for cutting an opening 29 in the wallboard.

The male die G will force the slug, cut out by both dies, off from the guide pins L and into the compartment 12 in the holder B. The slug can then be ejected through the opening 12a. The wedge-shaped edges 33 of the opening 29 in the wallboard M, shown in FIGURE 8, will form a wedge-shaped edge at the front surface 30 of the wallboard. Such a wedge-shaped edge will fit the contour of an electric outlet box, not shown, and can give slightly should the box not precisely fit into the opening. This can be accomplished without any undue bulging being noticeable on the front surface 30 of the wallboard. There is therefore an advantage in having the wall 29a of the opening 29 taper so that the area of the opening at the front surface of the wallboard is less than that of the opening at the rear surface.

The periphery of the flange 26 of the male die G that has the teeth 27 thereon is preferably spaced inward about one-fourth of an inch from the periphery formed by the teeth 17 on the female die C, although I do not wish to be confined to any precise measurement. When the two dies are moved toward each other by the blow on the head H, they will cut through the paper layers 30 and 32 and the gypsum core 31 will be broken along tapered planes that extend between the smaller area opening on the wallboard side 30 and the larger area opening on the wallboard side 32.

The two dies C and G can be quickly rotated through an arc of 90° in the manner already described when it is desirous of having the longitudinal axes of the two dies extend at right angles to the length of the frame A. The spring biased pin K will enter the recess 20 and hold the female die holder B from accidental rotation. Also the projection 23 on the metal spring handle N will enter the recess 25 and prevent the accidental rotation of the male die holder F.

I show a slightly modified form of the device in FIGURES 9 to 12 inclusive. Similar parts to the form shown in FIGURES 1 to 8 inclusive will be given the same letters and reference numerals except that they will be primed.

The frame P has two arms P1 and P2 that are pivotally connected by a bolt Q. The arm P1 takes the place of the arm E and supports a male die holder F' while the arm P2 takes the place of the offset A1 and supports the female die holder B'. The structure of the male die holder F' and the male die G' is identical to that of the male die holder F and the male die G and further detailed description need not be given.

The female die holder B' is not quite the same in structure as the die holder B. FIGURES 9, 10 and 12 show the die holder B' as having an integral knob D' and also as having an annular groove 50, see FIGURE 10. The outer end of the arm P2 has an opening for rotatably receiving the boss 51 of the holder B' and formed by the groove 50. A retaining disc R is mounted on the female die holder B' and is secured in place by screws 52, or other suitable fastening means. The die holder B' has the slug receiving recess 12' and the outlet opening 12a'.

The retaining disc R carries the female die C' and an entrance opening 52' in the disc permits the passage of the cut out slug shown at S in FIGURE 10, from the die C' into the compartment 12'. The female die C' is identical to the female die C in FIGURE 5. A spring-biased pin K' has its housing supported by the arm P2, see FIGURE 9, and the pin is yieldingly held in an opening 18' in the female die holder B'. The pin K' can be retracted from the opening 18' and then the knob D' can be rotated through an angle of 90° for bringing another recess 20' into registration with the pin. The pin will then enter the recess 20' to hold the die holder B' from accidental rotation.

A compression spring T is mounted between extended portions of the arms P1 and P2 and tends to urge these arms toward each other. FIGURE 9 shows the arms yieldingly holding the dies C' and G' in contact with the wallboard M.

The operation of this form of the device is the same as that set forth in describing the operation of the form shown in FIGURES 1 to 7 inclusive. Therefore no further description of the operation is deemed necessary.

I claim:

1. A device of the type described comprising:
   (a) a portable frame having two permanently connected arms;
   (b) a male die carried by one arm and having a head connected thereto in concentric relation therewith;
   (c) a female die carried by the other arm and having a knob connected thereto in concentric relation therewith;
   (d) said dies being arranged in spaced parallel relation to one another with cutting portions formed on adjacent surfaces thereof;
   (e) said male die and head having a common axis that coincides with a common axis of said female die and knob;
   (f) the cutting portions of said dies engaging opposite surfaces of a wallboard positioned between said dies;
   (g) said arms permitting movement of said dies toward one another when said head is struck a blow by an operator while at the same time holding said knob whereby said cutting portions will cut an opening in the wallboard and said knob will receive the force of said blow.

2. The combination a sset forth in claim 1; and in which
   (a) both of said die cutting portions are substantially rectangular in shape so as to be able to cut a substantially rectangular opening in the wallboard;
   (b) both of said dies being rotatably mounted in their arms and being rotatable about their axes into selected positions; and
   (c) means for securing said dies against accidental rotation from said selected positions.

3. The combination as set forth in claim 1: and in which
   (a) said male die having positioning guide pins disposed within the area bordered by the cutting portion of said die, said pins having pointed inner ends adapted to be driven into the wallboard without moving the die when the pins are struck a blow; said pins preventing any lateral movement of the die with respect to the wallboard during the forcing of the cutting portion of the die into the wallboard.

4. A device of the type described comprising:
   (a) a portable frame having two permanently connected arms adapted to straddle the thickness of a wallboard piece received between said arms;
   (b) a male die rotatably mounted at the free end of one arm;
   (c) said die having a substantially rectangular cutting portion whose plane is substantially at right angles to the axis of rotation;
   (d) guide pins frictionally carried by said die and disposed within the area enclosed by said cutting portion, the axes of said guide pins paralleling the axis of rotation of said die, said guide pins adapted to be driven into the wallboard portion that is to be cut;
   (e) a female die rotatably mounted at the free end of the other arm and having its axis substantially coinciding with the male die axis; said die having a cutting portion of the same shape but larger in area than the male die cutting portion, the plane of the female die cutting surface being at right angles to the axis of the female die;
   (f) said female die having a central opening for receiving the slug cut from the wallboard when the two dies are moved toward each other, the female die also having an outlet disposed at its side that communicates with said opening and is large enough to permit the cut slug to pass therethrough;
   (g) a head associated with the male die that may be struck for forcing the male die cutting portion into the wallboard; and
   (h) a handgrip portion associated with said female die to absorb the shock of the blow of a tool on said head for driving the cutting portion of the male die into the wallboard, the resistance offered by the female die causing its cutting portion to enter the wallboard from the opposite side;
   (i) whereby the two dies will be forced together for cutting a slug from the wallboard, said guide pins guiding the cutting portion of the male die so that it will cut the wallboard at the same position should it be necessary to strike the head more than once for cutting the slug.

5. The combination as set forth in claim 4; and in which
(a) both of said dies are rotatable about their axes into selected positions; and
(b) means for holding said dies against accidental rotation about their axes.

6. A device of the type described comprising:
(a) a portable frame having a pair of arms connected together at one end and arranged in spaced parallel relation to one another, at least one of said arms being resiliently urged towards the other arm;
(b) a holder rotatably mounted in the free end of each arm;
(c) a die mounted on the inner surface of each holder and arranged in opposed relation to one another;
(d) a knob mounted on the outer surface of one holder and a head mounted on the outer surface of the other holder;
(e) the knob and holder and die mounted on one arm having a common axis that coincides with the common axis of the head and holder and die mounted on the other arm;
(f) said dies having cutting portions formed thereon for engaging opposite surfaces of a wallboard positioned between said dies;
(g) one of said holders having a recess for receiving a portion of said wallboard upon a blow being struck upon said head by an operator while holding said knob to move said cutting portions towards one another through said wallboard.

References Cited

UNITED STATES PATENTS

| | | | |
|---|---|---|---|
| 685,212 | 10/1901 | Knowlton | 83—685 X |
| 1,191,680 | 7/1916 | Farrow | 30—358 |
| 1,540,860 | 6/1925 | Pobanz. | |
| 2,145,725 | 1/1939 | Jamieson. | |
| 2,787,324 | 4/1957 | Hartmeister et al. | 30—360 |
| 2,830,662 | 4/1958 | Marcum | 30—358 |
| 3,251,130 | 5/1966 | Miles | 30—358 |
| 3,273,241 | 9/1966 | Annes | 30—360 |

FOREIGN PATENTS

| | | |
|---|---|---|
| 851,760 | 1/1940 | France. |

OTHELL M. SIMPSON, *Primary Examiner.*

WILLIAM FELDMAN, *Examiner.*

G. WEIDENFELD, *Assistant Examiner.*